(12) United States Patent
Richey, II

(10) Patent No.: US 6,963,145 B2
(45) Date of Patent: Nov. 8, 2005

(54) SYSTEM AND METHOD FOR DRIVING AN ELECTRIC VEHICLE

(75) Inventor: Joseph B. Richey, II, Chagrin Falls, OH (US)

(73) Assignee: Invacare Corp., Elyria, OH (US)

( * ) Notice: Subject to any disclaimer, the term of this patent is extended or adjusted under 35 U.S.C. 154(b) by 0 days.

(21) Appl. No.: 10/068,391

(22) Filed: Feb. 6, 2002

(65) Prior Publication Data

US 2004/0195984 A1    Oct. 7, 2004

Related U.S. Application Data

(60) Provisional application No. 60/266,736, filed on Feb. 6, 2001.

(51) Int. Cl.[7] ............................................... B60L 1/00
(52) U.S. Cl. ........................................ 307/9.1; 307/10.1
(58) Field of Search ............................. 307/87, 43, 71, 307/45, 46, 54, 86, 9.1, 10.1; 180/65.3

(56) References Cited

U.S. PATENT DOCUMENTS

| | | | |
|---|---|---|---|
| 5,084,658 A | * | 1/1992 | Nielsen et al. ............... 318/139 |
| 5,157,267 A | | 10/1992 | Shirata et al. |
| 5,418,437 A | * | 5/1995 | Couture et al. ............. 318/139 |
| 5,530,788 A | * | 6/1996 | Saijima ....................... 388/811 |
| 5,710,699 A | | 1/1998 | King et al. |
| 5,734,258 A | | 3/1998 | Esser |
| 6,087,802 A | | 7/2000 | James |
| 6,107,761 A | * | 8/2000 | Seto et al. .................. 318/139 |

OTHER PUBLICATIONS

PCT International Search Report (4 pages).
Vicor, VI-200 DC-DC Converters 50 to 200 Watts, Converter Selection Chart, Sep. 1999, 2 pages.
Vicor, Data Sheets: 2nd Generation DC-DC Converter Modules, 1 page, no date.

* cited by examiner

*Primary Examiner*—Robert L. Deberadinis
(74) *Attorney, Agent, or Firm*—Calfee, Halter & Griswold LLP

(57) ABSTRACT

A system and method for driving an electric vehicle is provided. The system has, for example, a power source generating a voltage, a voltage converter, a control system, and one or more motors for driving or propelling the vehicle. The voltage converter is configured to accept an input voltage and generate an output voltage, which is different from the input voltage. The power source provides the input voltage to the voltage converter. A switch is further provided to switch the delivery of power to the control system between a power source voltage and an increased voltage derived from the voltage converter.

5 Claims, 3 Drawing Sheets

SYSTEM AND METHOD FOR DRIVING AN ELECTRIC VEHICLE

FIELD OF THE INVENTION

The invention relates generally to electric vehicles and, more particularly, to electric vehicles having storage-based energy sources such as, for example, batteries.

BACKGROUND OF THE INVENTION

Most electric vehicles derive their source of energy from a battery-based power source. In this regard, electric vehicles such as, for example, power wheelchairs, are designed to operate on an industry standard system delivering power at approximately 24 volts. In most cases, power delivered at this voltage is sufficient to provide adequate mobility and maneuverability. However, in scenarios such as, for example, ascending an incline or traversing obstacles such as curbs and steps, this voltage level may be inadequate. More specifically, while the vehicle may be able to ascend the incline or traverse the obstacle, it may noticeably "struggle" in doing so. For example, the vehicle may slow down or not be able to maintain a constant velocity. Hence a system and method for driving or powering electrically driven vehicles that does not suffer from these drawbacks is highly desirable.

SUMMARY OF THE INVENTION

According to one embodiment of the present invention, a system for an electrically driven vehicle is provided. The system has, for example, a power source generating a voltage, a voltage converter, a control system, and one or more motors for driving or propelling the vehicle. The voltage converter is configured to accept an input voltage and generate an output voltage, which is different from the input voltage. The power source provides the input voltage to the voltage converter. In a first embodiment, the voltage converter generates a voltage that is less than the input voltage. So configured, the power source and the output of the voltage converter are in series communication to provide power to the control system that is at a higher voltage than provided by the power source alone. In a second embodiment, the voltage converter generates an output voltage that is greater than the input voltage. So configured, the output of the voltage converter is in circuit communication the control system and provides a voltage that is higher than the power source alone. In either embodiment, a switch can be used to provide power at the voltage of the power source or the increased voltage generated through use of the voltage converter.

In yet another embodiment, a system for driving an electric vehicle is provided that includes, for example, power source, a voltage booster circuit in circuit communication with the power source, a control circuit in circuit communication with the power source and voltage booster circuit, and a switch in circuit communication with the power source, voltage booster circuit, and control circuit. The switch has a first state for connecting the power source to the control circuit and a second state for connecting the voltage booster circuit to the control circuit. The voltage booster circuit preferably includes a voltage converter. The voltage converter comprises an input and an output and, in one embodiment, the output is configured to provide a higher voltage than the input, while in another embodiment, the output is configured to provide a lesser voltage than the input. The control system further comprises logic for switching the switch between the first and second states.

In yet another embodiment, a system for driving an electric vehicle is provided that includes, for example, a voltage booster circuit in circuit communication with a power source, a control circuit having a drive output signal and in circuit communication with the power source and voltage booster circuit, a switch in circuit communication with the power source, voltage booster circuit, and control circuit, and logic for controlling the state of the switch based on the drive output signal. The switch includes selectively activatable first and second states. The first state connects the power source to the control circuit and the second state connects the voltage booster circuit to the control circuit. The logic for controlling the state of the switch based on the drive output signal includes logic for placing the switch in the second state when the drive signal is above a predetermined threshold level and logic for placing the switch in the first state when the drive signal is below a predetermined threshold level. The drive output signal can be, for example, a pulse-width modulated signal. The predetermined threshold includes, for example, a duty cycle ratio threshold wherein the duty cycle ratio includes, for example, a duty cycle ratio of at least 75% or greater on-time compared to off-time.

Therefore, it is an advantage of the present invention to provide a system for powering a vehicle that provides power at a higher voltage without the need for replacing conventional batteries.

It is another advantage of the present invention to provide a system for powering a vehicle that increases motor speed without the need for replacing conventional motors on the vehicle.

It is also another advantage of the present invention to provide a system for powering a vehicle that increases the vehicle's speed without changing the ratio(s) of the vehicle's motor drive gearboxes.

Hence, by providing a selectively activatable boost in the voltage associated with a vehicle's drive motors, an increase in the performance of the vehicle can be obtained by allowing the motors to develop an increased top or maximum speed. This is especially beneficial when the vehicle is ascending inclines or traversing obstacles such as curbs or steps.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENTS

Prior to discussing the various embodiments of the present invention, a review of the definitions of some exemplary terms used throughout the disclosure is appropriate. Both singular and plural forms of all terms fall within each meaning:

"Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Signal," includes one or more electrical signals, analog or digital signals, one or more computer instructions, a bit or bit stream, or the like.

"Software," as used herein, includes but is not limited to one or more computer readable and/or executable instructions that cause a computer or other electronic device to perform functions, actions, and/or behave in a desire manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

Figure 1:
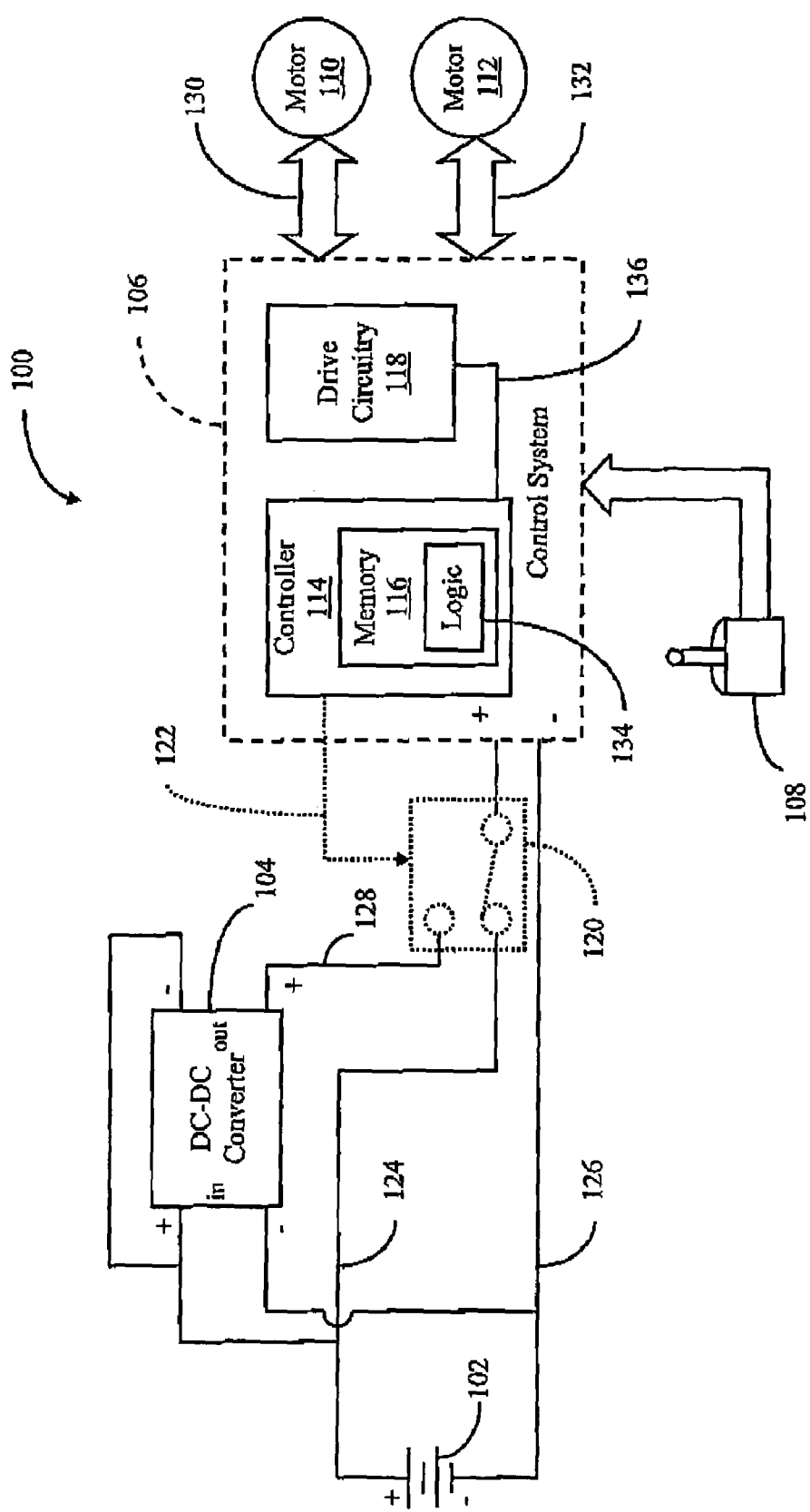
FIG. 1 is a general block diagram of a first embodiment of a system 100 of the present invention.

Referring now to FIG. 1, a system 100 of the first embodiment of the present invention is shown. System 100 has a power source or battery 102, a voltage booster circuit or DC-to-DC converter 104, control system 106, user manipulable input device 108, and motors 110 and 112. The controller 106 further has a memory 116 and control logic 134. A control bus 136 places controller 114 and drive circuitry 118 in communication with each other allowing controller 114 to direct drive circuitry 114 to appropriately drive motors 110 and 112. Battery 102 is preferably multi-celled and can be in the form of one or more batteries usually coupled in series. Battery 102 preferably provides power to the remainder of system 100 at a voltage level of approximately 24 volts. However, other voltage levels are contemplated to be within the scope of the present invention. The positive output terminal of battery 102 is connected to a node 124 and the negative output terminal thereof is connected to a node 126.

Nodes 124 and 126 are in circuit communication with the positive and negative input terminals, respectively, of DC-to-DC converter 104 thereby providing an input voltage of approximately 24 volts. Node 124 is also in circuit communication with the negative output terminal of DC-to-DC converter 104. In this regard, DC-to-DC converter 104 preferably converts a first voltage level at its input to a second voltage level at its output. In the most general sense, the second voltage level can be either greater or less than the first voltage level. In the illustrated embodiment, DC-to-DC converter 104 preferably converts a 24 volt input to a 5 volt output. One such suitable DC-to-DC converter 104 includes, for example, the VI-200 family of DC-to-DC converters manufactured by VICOR Corp. of Andover, Mass. So configured, the positive output terminal, or node 128, is at an electrical potential of 5 volts greater than the negative output terminal of converter 104. In the illustrated embodiment, the negative output terminal of converter 104 is in circuit communication with node 124, which is at approximately 24 volts, thus resulting in node 128 being at an electrical potential of approximately 29 volts.

As will be described presently in more detail, either node 128 supplying approximately 29 volts, or node 124 supplying approximately 24 volts, are in circuit communication with control system 106. In general, control system 106 has a controller 114, memory 116, control logic 134 and drive circuitry 118. These components function to take input signals from a user and accordingly drive motors 110 and 112 via buses 130 and 132. The motors are preferably driven by a Pulse-Width Modulated (hereinafter PWM) drive signal having a frequency and amplitude (i.e., voltage). Varying the duty cycle of the PWM drive signal varies the power delivered to the motors from drive circuitry 118. Configured as such, controller 114 generally provides at least one PWM drive control signal to drive circuitry 118. Drive circuitry 118 decodes the one or more PWM drive control signals into individual PWM drive signals that are used to drive motors 110 and 112. It should also be noted that control system 106 has circuitry for maintaining its own internal supply voltage such that it does not significantly vary regardless of whether node 124 or node 128 are connected thereto. Suitable control systems 106 include, for example, the MKIV and the MKIVGB controllers manufactured by INVACARE Corp. of Elyria, Ohio.

System 100 is configured such that either node 125 supplying power at approximately 24 volts, or node 128 supplying power at approximately 29 volts, are in circuit communication with control system 106. In this regard, node 128 supplying approximately 29 volts can be directly connected to control system 106 thereby providing power at a voltage that is approximately 5 volts higher than the battery 102 voltage. This provides control system 102 with a higher operating voltage from which to control motors 110 and 112. Such a higher operating voltage is advantageous when, for example, the vehicle has a high gearbox ratio so it can ascend an incline or traverse an obstacle such as a curb or step because it allows the motors to develop an increased top or maximum speed that makes up for the high gearbox ratio and allows the vehicle to have an increased speed in such situations. This is because increasing the voltage that can be supplied to the motors 110 and 112 generally increases their top obtainable speed, which in turn increases the vehicle's top obtainable speed.

Alternatively, either node 124 supplying approximately 24 volts, or node 128 supplying approximately 29 volts, can be selectively placed in circuit communication with control system 106. This is preferably accomplished via a switch 120. Switch 120 can be in either of two embodiments. In a first embodiment, switch 120 can be a user manipulable switch such as, for example, a lever or pushbutton having mechanical contacts that change position based on the lever or pushbutton position. In a second embodiment, switch 120 can be a relay that is controlled by control logic 134. In this embodiment, a signal line 122 from control system 106 is used to change the position of switch 120 to either connect node 124 or node 128 to control system 106. The control logic 134 is further discussed below in connection with FIG. 3.

Figure 2:
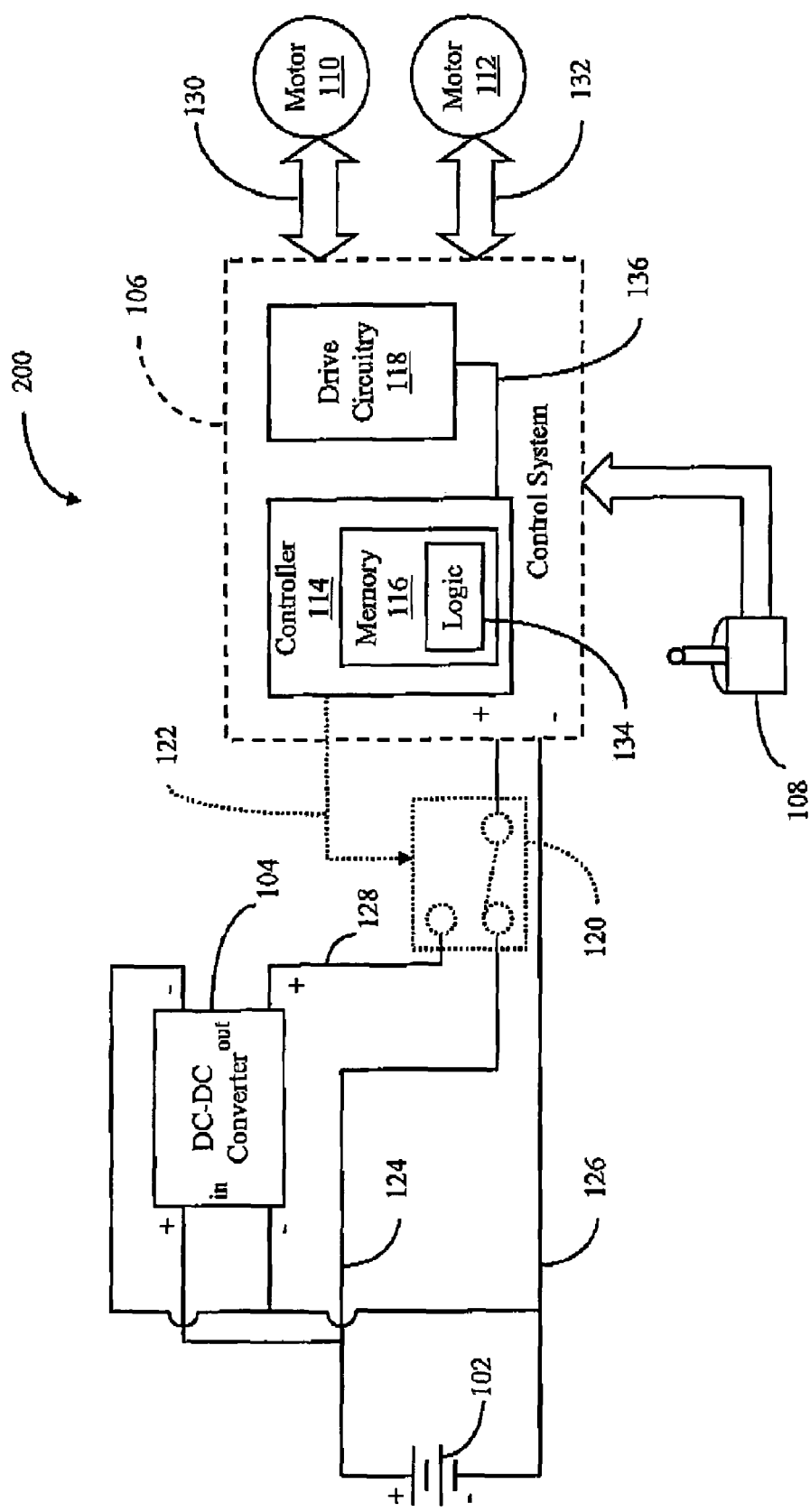
FIG. 2 is a general block diagram of a second embodiment of a system 200 of the present invention.

Illustrated in FIG. 2 is a second embodiment the present invention in the form of a system 200. System 200 is substantially similar to system 100 of FIG. 1, except that DC-to-DC converter 104 is configured to provide an output voltage that is greater than its input voltage. In this embodiment, nodes 124 and 126 provide an input voltage of approximately 24 volts to DC-to-DC converter 104. Therefrom, DC-to-DC converter 104 generates an output voltage at node 128 that is approximately 29 volts. As described earlier, node 128 can be placed in circuit communication with control system 106 either directly or through switch 120.

In summary, connecting node 128 at approximately 29 volts to control system 106 provides power to the vehicle at a voltage that is 5 volts higher than otherwise provided by battery 102. The effect on the vehicle is to provide a higher motor speed by increasing the amplitude of the PWM drive signal delivered to each motor by 5 volts. This higher motor speed is especially advantageous when high gearbox ratios are used to facilitate ascending inclines or traversing objects.

Figure 3:
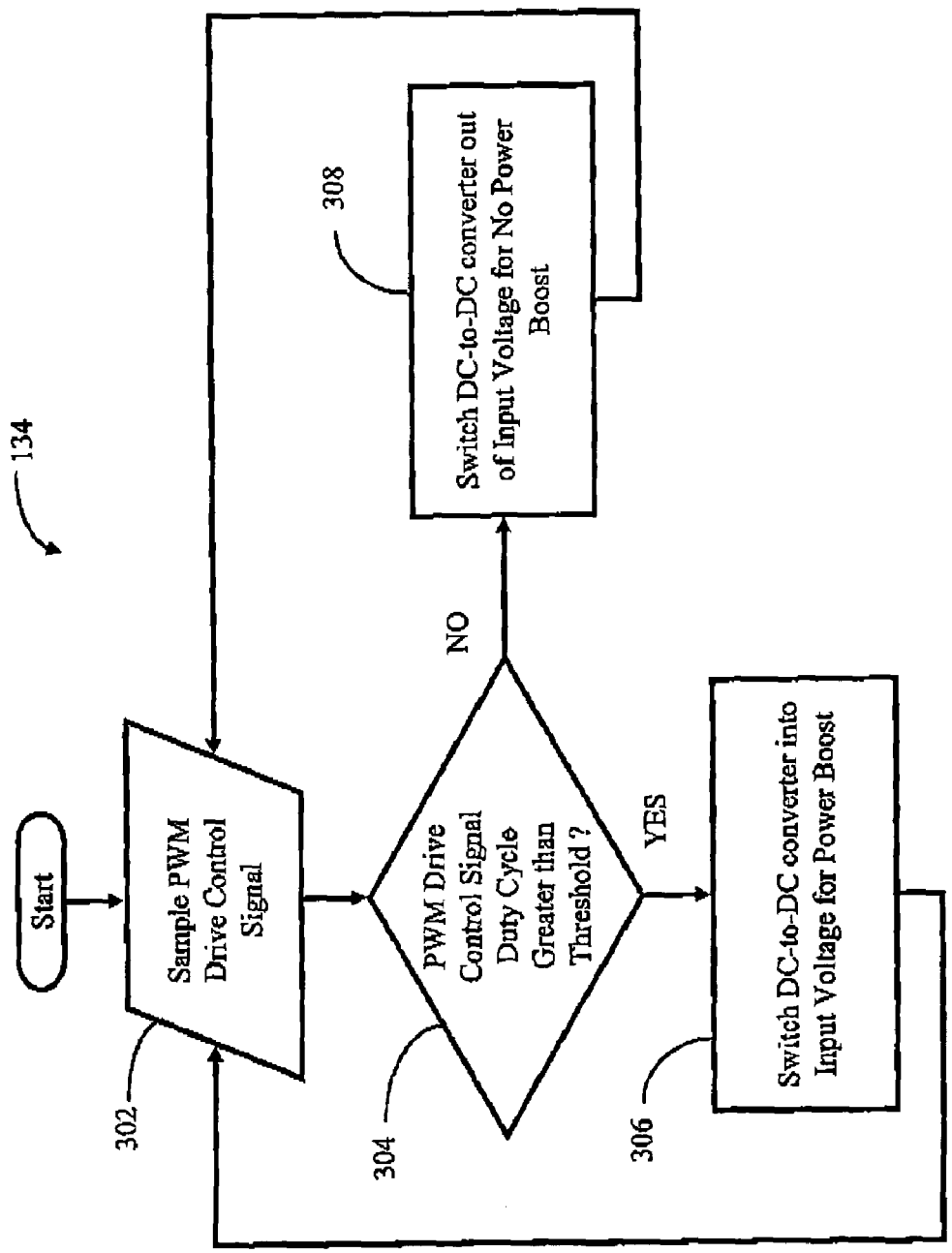
FIG. 3 is a flow chart of one embodiment of the logic of the present invention.

Referring now to FIG. 3, one embodiment of control logic 134 is illustrated. The illustrated elements denote "processing blocks" and represent computer software instructions or groups of instructions that cause a computer to perform an action(s) and/or to make decisions. Alternatively, the processing blocks represent functions and/or actions performed by functionally equivalent circuits such as a digital signal processor circuit or an application specific integrated circuit (ASIC). The flowchart diagram of FIG. 3, as well as the other illustrated diagrams, does not depict syntax of any particular programming language. Rather, the diagram illustrates functional information one skilled in the art could use to fabricate circuits, to generate computer software, or a combination of hardware and software to perform the illustrated processing. It will be appreciated that electronic and software applications may involve dynamic and flexible processes such that the illustrated blocks can be performed in other sequences different than the one shown and/or blocks may be combined or separated into additional components. They may also be implemented using various programming approaches such as machine language, procedural, object oriented and/or artificial intelligence techniques.

In particular, control logic 134 is executed by controller 114 within the control system 106. Controller 114 is preferably a microprocessor-based controller capable of executing software and having a plurality of inputs and outputs. In this regard, controller 114 generally generates at least one PWM drive control signal for each motor, which is sent to drive circuitry 114 for further decoding into PWM drive signals that drive motors 110 and 112. These PWM drive signals are sampled, read, or monitored in step 302 by the control logic 134.

In step 304, the control logic tests to determine if the PWM drive control signal's duty cycle is greater than a predetermined threshold. The duty cycle is the ratio of on time to off time of the PWM drive signal. Preferred duty cycle thresholds can be set anywhere from 70% to 95% on-time compared to off-time. Most preferably, the duty cycle threshold is set at approximately 90% on-time. Alternatively, the PWM drive signal of associated with each motor may be tested against this threshold. In any event, if the duty cycle threshold ratio is exceeded by the PWM drive control signal, the logic advances to step 306. In step 306, the control logic 134 causes controller 114 to change the state of switch 120 via line 122 thus connecting DC-to-DC converter 104 to control system 106 for allowing the generation of PWM drive signals having increased amplitudes from which motors 110 and 112 are drive. In this embodiment, switch 120 is either a relay-actuated switch or a solid-state switch such as a MOSFET or similar switching device. As described above, controller 106 has its own internal power supply circuitry that ensures that its own operating voltage remains constant. Hence, having DC-to-DC converter 104 connected to control system 106, an increased voltage is now available from which motors 110 and 112 can be driven thereby increasing the motor and, hence, the vehicle's maximum obtainable speed.

If in step 304, the PWM drive control signal is not above the predetermined threshold duty cycle, the control logic 134 advances to step 308 where it either maintains the DC-to-DC converter 104 isolated from control system 106 or, if previously connected, causes the DC-to-DC converter 104 to be isolated from control system 106. This is accomplished by control logic 134 causing controller 114 to change the state of switch 120 via line 122 so that DC-to-DC converter 104 is isolated from control system 106. Following either steps 306 or 306, the control logic loops back to step 302 to once again sample, monitor, or read the PWM drive control signals.

In another embodiment, the control logic 134 can have a second duty cycle threshold, different from the first duty cycle threshold described above, so that when the PWM drive control signal is below the second duty cycle threshold, the DC-to-DC converter 104 is then isolated from the control system 106. Such a second duty cycle threshold provides the beneficial effects of a hysteresis loop by introducing a lag in the switching states such that it takes a larger duty cycle threshold to connect DC-to-DC converter 104 to control system 106 than the duty cycle required to isolate or disconnect DC-to-DC converter 104 from control system 106. This is beneficial to prevent rapid cycling of the switching states if the duty cycle of the PWM drive control signal is "hovering" near the duty cycle threshold such that it often crosses above and drops below the threshold over a relatively short period of time.

Hence, control logic 134 provides an embodiment of the present invention wherein the DC-to-DC converter 104 and its increased voltage output is either switched in or out of control system 106 based on how the motors 110 and 112 are drive. For example, a threshold duty cycle of greater than 75% indicates that the motors are being driven to deliver a relative high vehicle speed. In such a situation, the control logic 134 provides the DC-to-DC converter 104 increased voltage output to control system 106 so as to be able to further increase the motor and vehicle's speed. Below such a threshold, the DC-to-DC converter is isolated from the control system 106 because the battery voltage is sufficient to provide the required motor and vehicle speed.

While the present invention has been illustrated by the description of embodiments thereof, and while the embodiments have been described in considerable detail, it is not the intention of the applicant to restrict or in any way limit the scope of the application to such detail. Additional advantages and modifications will readily appear to those skilled in the art. For example, the voltage converter can generate voltages of almost any desired value. Additionally, while two motors have been illustrated, the present invention is generally applicable to any electrically driven vehicle having one or more motors. Furthermore, the power source and voltage boost circuit can be combined into a single power circuit. Therefore, the invention, in its broader aspects, is not limited to the specific details, the representative apparatus, and illustrative examples shown and described. Accordingly, departures can be made from such details without departing from the spirit or scope of the applicant's general inventive concept.

I claim:

1. A system for driving an electric vehicle comprising:
   (a) power source;
   (b) a voltage booster circuit in circuit communication with the power source, wherein the voltage booster circuit comprises a voltage converter, wherein said voltage converter comprises an input and an output and wherein the output is configured to provide a lesser voltage than the input;

(c) a control circuit in circuit communication with the power source and voltage booster circuit, the control circuit comprising: a drive circuit in circuit communication with at least one motor; and (d) a switch in circuit communication with the power source, voltage booster circuit, and control circuit, the switch comprising a first state for connecting the power source to the control circuit and a second state for connecting the voltage booster circuit to the control circuit;

(e) wherein the power source comprises a positive terminal having a voltage and a negative terminal and wherein the voltage converter output comprises a positive terminal and a negative terminal and wherein the voltage converter's negative terminal comprises a voltage approximately equal to the voltage of the positive terminal of the power source.

2. The system of claim 1 wherein the control circuit further comprises a logic for switching the switch between the first and second states.

3. A system for driving an electric vehicle comprising:

(a) a voltage booster circuit in circuit communication with a power source, said voltage booster circuit comprising a voltage converter, wherein the voltage converter comprises an input and an output and wherein the output is configured to provide a lesser voltage than the input;

(b) a control circuit in circuit communication with the power source and voltage booster circuit, the control circuit comprising: drive output signal and a drive circuit in circuit communication with at least one motor;

(c) a switch in circuit communication with the power source, voltage booster circuit, and control circuit, the switch comprising selectively activatable first and second states, the first state connecting the power source to the control circuit and the second state connecting the voltage booster circuit to the control circuit; and (d) logic for controlling the state of the switch based on the drive output signal;

(e) wherein the power source comprises a positive terminal having a voltage and a negative terminal and wherein the voltage converter output comprises a positive terminal and a negative terminal and wherein the voltage converter's negative terminal comprises a voltage approximately equal to the voltage of the positive terminal of the power source.

4. The system of claim 3 wherein the logic for controlling the state of the switch based on the drive output signal comprises logic for placing the switch in the second state when the drive signal is above a predetermined threshold level.

5. The system of claim 3 wherein the logic for controlling the state of the switch based on the drive output signal comprises logic for placing the switch in the first state when the drive signal is below a predetermined threshold level.

* * * * *